US011884073B2

(12) United States Patent
Kanzaki

(10) Patent No.: US 11,884,073 B2
(45) Date of Patent: Jan. 30, 2024

(54) LIQUID DISCHARGING HEAD AND PRINTING APPARATUS

(71) Applicant: BROTHER KOGYO KABUSHIKI KAISHA, Nagoya (JP)

(72) Inventor: Shotaro Kanzaki, Handa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/747,542

(22) Filed: May 18, 2022

(65) Prior Publication Data

US 2022/0379611 A1 Dec. 1, 2022

(30) Foreign Application Priority Data

May 27, 2021 (JP) ................................. 2021-089566

(51) Int. Cl.
*B41J 2/14* (2006.01)

(52) U.S. Cl.
CPC ......... *B41J 2/14274* (2013.01); *B41J 2/1433* (2013.01); *B41J 2002/14419* (2013.01); *B41J 2002/14459* (2013.01)

(58) Field of Classification Search
CPC .................. B41J 2/14274; B41J 2/1433; B41J 2002/14419; B41J 2002/14459; B41J 2/14233; B41J 2202/12
See application file for complete search history.

(56) References Cited

U.S. PATENT DOCUMENTS

2020/0307203 A1* 10/2020 Katayama ................ B41J 2/175

FOREIGN PATENT DOCUMENTS

JP 2018-103389 A 7/2018

* cited by examiner

*Primary Examiner* — Lisa Solomon
(74) *Attorney, Agent, or Firm* — Merchant & Gould P.C.

(57) ABSTRACT

There is provided liquid discharging head including individual channels, supply throttles, and return throttles formed in plates. The supply throttles are formed in first plate of the plates and the return throttles are formed in second plate of the plates. Each of the supply throttles has cross section which is rectangle having first and second sides. Each of the return throttles has cross section which is rectangle having first and second sides. The length of the first side of each of the supply throttles and the length of the first side of each of the return throttles are substantially identical. The length of the second side of each of the supply throttles and the length of the second side of each of the return throttles are substantially identical. Aspect ratio of each of the supply throttles and aspect ratio of each of the return throttles are substantially identical.

9 Claims, 6 Drawing Sheets

LIQUID DISCHARGING HEAD AND PRINTING APPARATUS

CROSS REFERENCE TO RELATED APPLICATIONS

The present application claims priority from Japanese Patent Application No. 2021-089566, filed on May 27, 2021, the disclosure of which is incorporated herein by reference in its entirety.

BACKGROUND

The present disclosure relates to a liquid discharging head which discharges or ejects a liquid from a nozzle, and a printing apparatus.

There is a known liquid discharging head provided with a channel member constructed of a plurality of stacked plates, and including a plurality of pressurizing chambers each of which is connected to one of a plurality of discharge holes (nozzles); and a plurality of pressurizing parts each of which pressurizes a liquid inside one of the plurality of pressurizing chambers. The channel member is further provided with: a first common channel (supply manifold) which is provided commonly with respect to the plurality of pressurizing chambers and which supplies the liquid to the plurality of pressurizing chambers; a plurality of first individual channels and a plurality of second individual channels (supply throttles) each of which links or connects one of the plurality of pressurizing chambers and the first common channel; a second common channel (return manifold) which is provided commonly with respect to the plurality of pressurizing chambers and into which the liquid flowed out from the plurality of pressurizing chambers flows; and a plurality of third individual channels (return throttles) each of which links or connects one of the plurality of pressurizing chambers and the second common channel. The plurality of first individual channels and the plurality of second individual channels (supply throttles), and the plurality of third individual channels (return throttles) are formed in mutually different plates.

In such a liquid discharging head, the liquid is supplied to each of the pressurizing chambers from the first common channel via the first individual channel and the second individual channel, and a part of the liquid supplied to each of the pressurizing chambers is fed to the second common channel via the third individual channel. Namely, in this liquid discharging head, the liquid is fed from the first common channel to the second common channel, via the pressurizing chamber, thereby making it possible to circulate the liquid inside the head.

SUMMARY

According to an aspect of the present disclosure, there is provided a liquid discharging head having a plurality of plates stacked in a stacking direction.

The liquid discharging head including:

- a plurality of individual channels each has a nozzle configured to discharge a liquid;
- a supply manifold which is provided commonly to the plurality of individual channels and which is configured to supply the liquid to the plurality of individual channels;
- a plurality of supply throttles each connecting one of the plurality of individual channels and the supply manifold;
- a return manifold which is provided commonly to the plurality of individual channels and into which the liquid flowed out from the plurality of individual channels flows; and
- a plurality of return throttles each connecting one of the plurality of individual channels and the return manifold.

Each of the plurality of individual channels, the supply manifold, the plurality of supply throttles, the return manifold and the plurality of return throttles is formed in the plurality of plates.

The plurality of supply throttles is formed in a first plate of the plurality of plates and the plurality of return throttles is formed in a second plate of the plurality of plates different from the first plate.

Each of the plurality of supply throttles has a cross section, in a plane orthogonal to a flowing direction of the liquid in the each of the plurality of supply throttle, which is a rectangle having a first side and a second side, a length of the second side being not less than a length of the first side.

Each of the plurality of return throttles has a cross section, in a plane orthogonal to a flowing direction of the liquid in the each of the plurality of return throttle, which is a rectangle having a first side and a second side, a length of the second side being not less than a length of the first side.

The length of the first side of each of the plurality of supply throttles and the length of the first side of each of the plurality of return throttles are substantially identical to each other.

The length of the second side of each of the plurality of supply throttles and the length of the second side of each of the plurality of return throttles are substantially identical to each other.

An aspect ratio of each of the plurality of supply throttles which is a ratio between the first side of each of the plurality of supply throttles and the second side of each of the plurality of supply throttles and an aspect ratio of each of the plurality of return throttles which is a ratio between the first side of each of the plurality of return throttles and the second side of each of the plurality of return throttles are substantially identical to each other.

DETAILED DESCRIPTION

In the liquid discharging head as described above, it is necessary to adjust the pressure of the liquid in the vicinity of the nozzle so that the liquid circulating inside the head does not leak from the nozzle. Specifically, it is necessary to balance channel resistance in the supply throttle which is the channel supplying the liquid in the first common channel to the pressurizing chamber (first and second individual channels) and channel resistance in the return throttle which is the channel feeding the liquid in the pressurizing chamber to the second common channel (third individual channels) so that the pressure of the liquid in the vicinity of the nozzle becomes to be a desired pressure. In a case, however, that difference in a deviating amount from a designed value due to any manufacturing error becomes great between a supply throttle and a return throttle connecting or linking to a same pressurizing chamber, the pressure of the liquid in the vicinity of the nozzle is greatly deviated from the desired pressure.

In particular, in a case of forming the supply throttle and the return throttle in the mutually different plates, as in Japanese Patent Application Laid-open No. 2018-103389, the extent of the manufacturing error varies from plate to plate, and the difference between deviating amount from the designed value of the supply throttle and deviating amount from the designed value of the return throttle is likely to be great.

An object of the present disclosure is to provide a liquid discharging head capable of making the influence of the manufacturing errors in the supply and return throttles on the pressure in the vicinity of the nozzle to be small.

According to the liquid discharging head of the present disclosure, even in a case that a plate in which the plurality of supply throttles is formed and a plate in which the plurality of return throttles is formed are different from each other, it is possible to make the different between the deviating amount from the designed value of the supply throttle and the deviating amount from the designed value of the return throttle to be small, because each of the lengths of the first side, the lengths of the second side, and aspect ratios is substantially identical to each other between a rectangle cross section of the supply throttle and a rectangular cross section of the return throttle. Accordingly, it is possible to making the influence, of the manufacturing errors in the supply and return throttles, on the pressure in the vicinity of the nozzle to be small.

First Embodiment

In the following, a first embodiment of the present disclosure will be explained.

<Overall Configuration of Printer>

Figure 1:
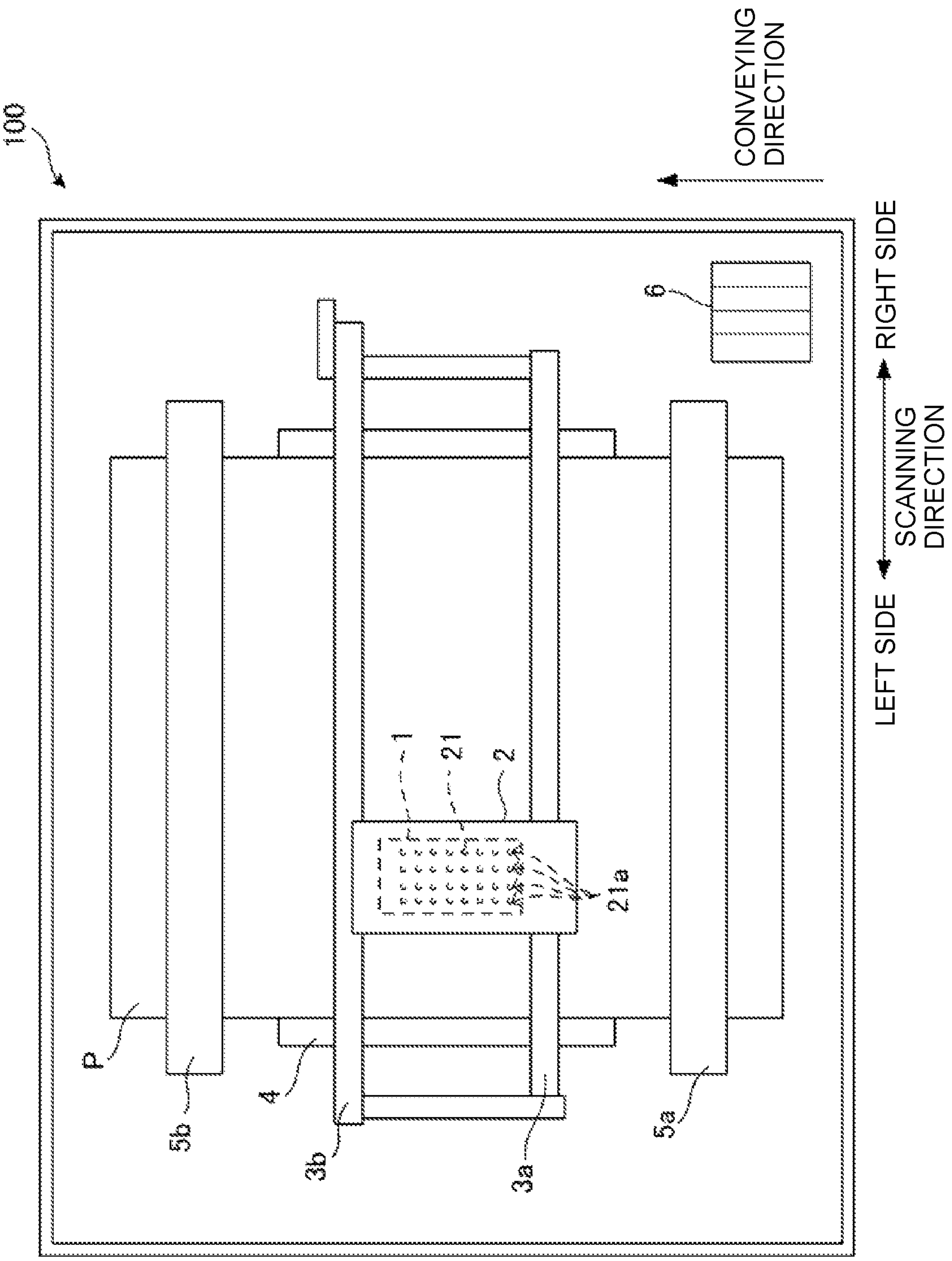
FIG. 1 is a plane view of a printer including an ink-jet head.

As depicted in FIG. 1, a printer 100 according to the present embodiment is provided with an ink-jet head 1 (an example of a "liquid discharging head" of the present invention), a carriage 2, guide rails 3*a* and 3*b*, a platen 4, conveying rollers 5*a* and 5*b*, and an ink tank 6.

The carriage 2 is supported by the two guide rails 3*a*, 3*b* extending in a scanning direction (left-right direction in FIG. 1) which is along the horizontal direction, and moves in the scanning direction along the guide rails 3*a*, 3*b*. The ink-jet head 1 is mounted on the carriage 2, and moves in the scanning direction together with the carriage 2. In the following explanation, the right side in FIG. 1 is defined as "right side" in the scanning direction and the left side in FIG. 1 is defined as "left side" in the scanning direction.

Four color inks which are black, yellow, cyan and magenta inks are supplied to the ink-jet head 1 from the ink tank 6, via a non-illustrate tube. The ink-jet head 1 discharges or ejects the ink(s) from a plurality of nozzles 21 opened in a nozzle surface 11*y* (see FIG. 3) which is the lower surface of the ink-jet head 1.

The plurality of nozzles 21 form a nozzle row 21*a* along a conveying direction (a direction oriented from the lower side toward the upper side in FIG. 1) which is orthogonal to the scanning direction in a plane view. The ink-jet head 1 has a four pieces of the nozzle row 21*a* which are arranged side by side in the scanning direction. The black, yellow, cyan and magenta inks are discharged from the plurality of nozzles of the first, second, third, and fourth nozzle rows 21*a* from the right side in the scanning direction, respectively. Note that the configuration of the ink-jet head 1 will be explained in detail later on.

The platen 4 is arranged so as to face or be opposite to the nozzle surface 11*y* which is the lower surface of the ink-jet head 1, and extends in the scanning direction over the entire length of a recording sheet (recording paper, recording paper sheet) P. The platen 4 supports the recording sheet P from therebelow. The conveying rollers 5*a* and 5*b* are arranged, respectively, on the upstream side and the downstream side in the conveying direction with respect to the carriage 2, and convey the recording sheet P in the conveying direction.

In the printer 100, a conveying processing of conveying the recording sheet P in the conveying direction by the conveying rollers 5*a* and 5*b* by a predetermined distance and a scanning processing of causing the ink(s) to be discharged from the plurality of nozzles 21 of the ink-jet head 1 while moving the carriage 2 in the scanning direction are alternately performed to thereby perform printing on the recording sheet P. Namely, the printer 100 is of the serial system. Note that in the following explanation, a direction orthogonal to both of the scanning direction and the conveying direction is defined as the up-down direction.

<Ink-Jet Head 1>

Figure 2:
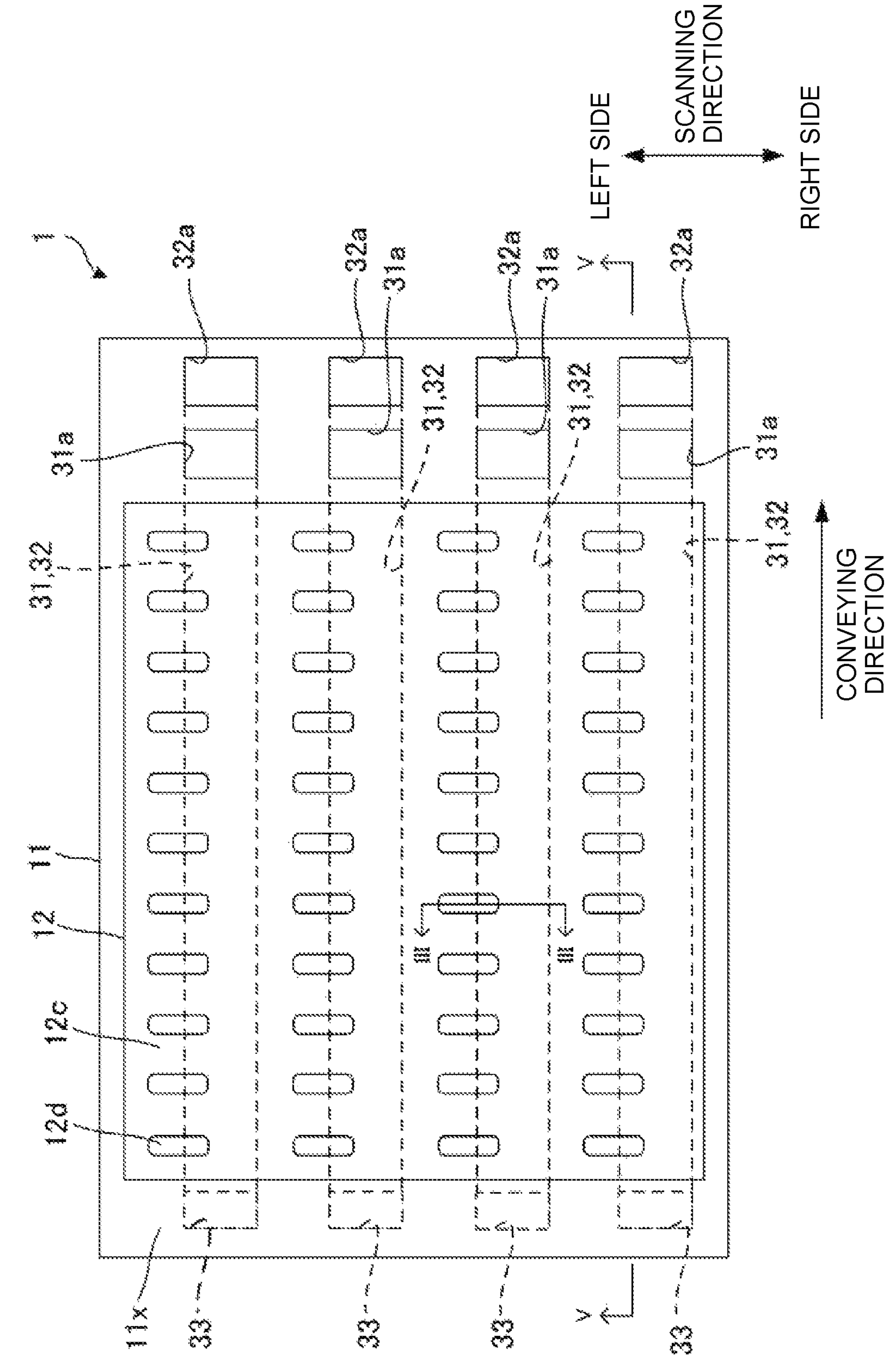
FIG. 2 is a plane view of the ink-jet head depicted in FIG. 1.

Next, the specific configuration of the ink-jet head 1 will be explained, with reference to FIGS. 2 to 5. As depicted in FIG. 2, the ink-jet head 1 has a rectangular shape which is long in the conveying direction in a top view. The ink-jet head 1 is provided with a channel unit 11, a piezoelectric actuator 12, etc.

Figure 3:
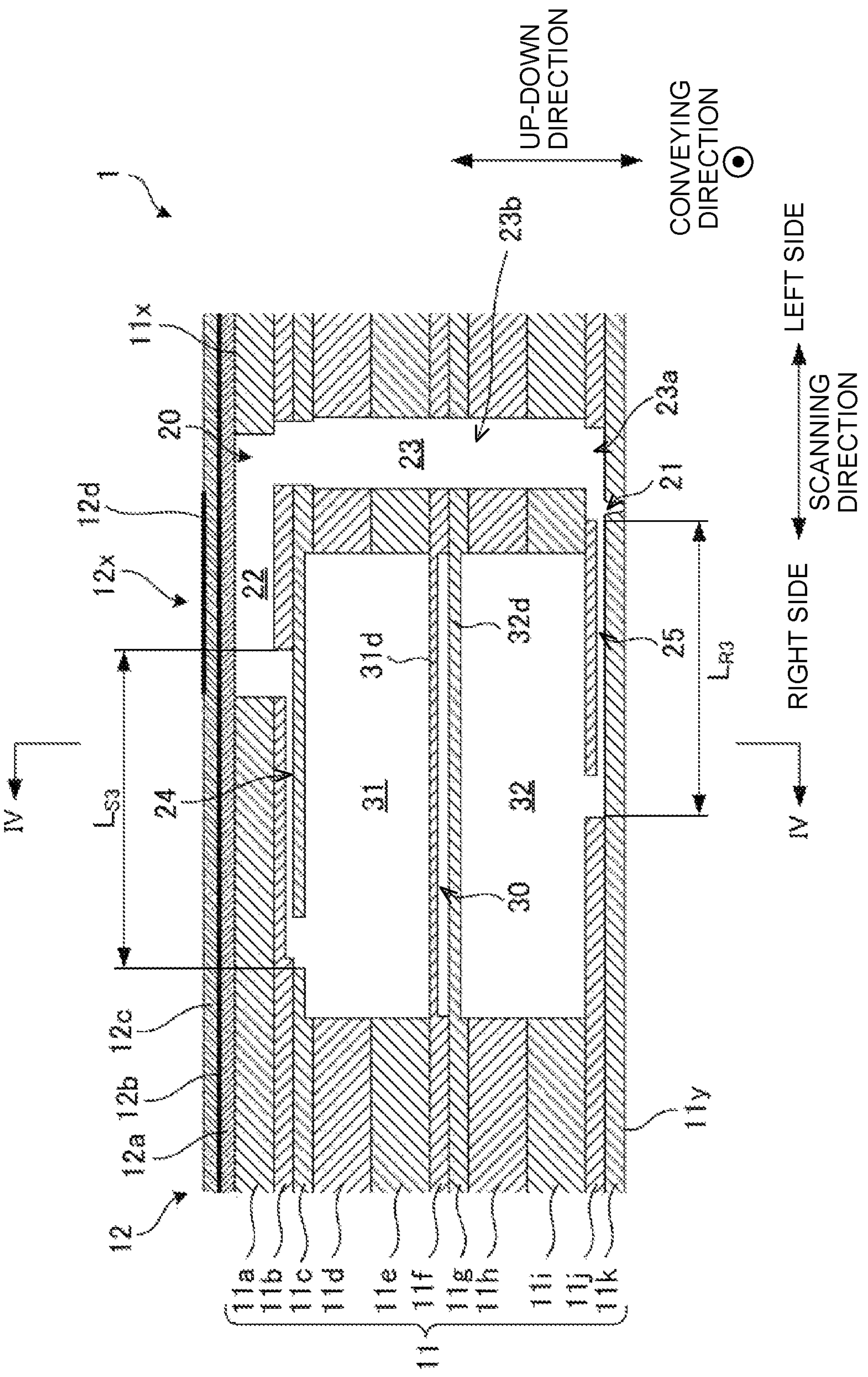
FIG. 3 is a cross-sectional view of the ink-jet head along a line in FIG. 2.
Figure 4:
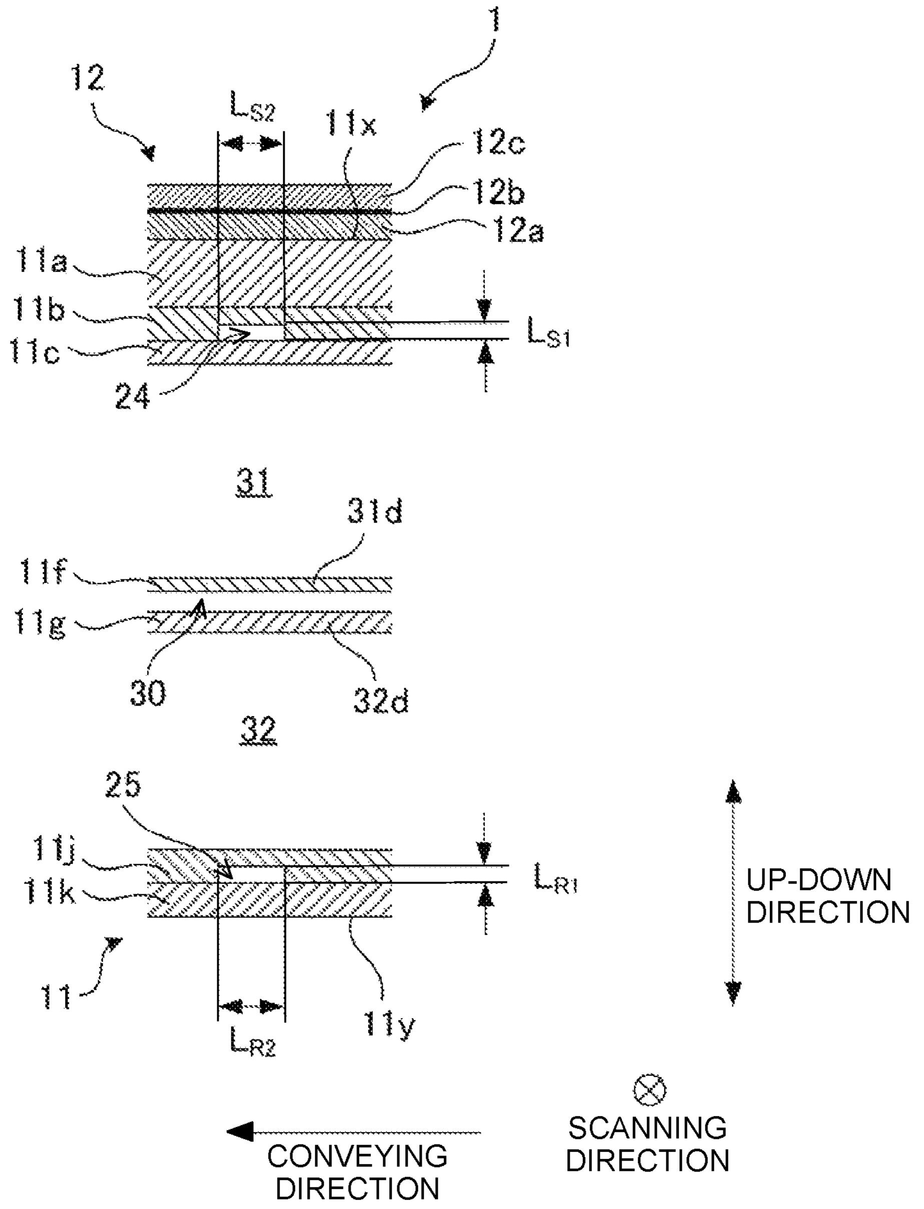
FIG. 4 is a partial cross-sectional view of the ink-jet head along a IV-IV line in FIG. 3.
Figure 5:
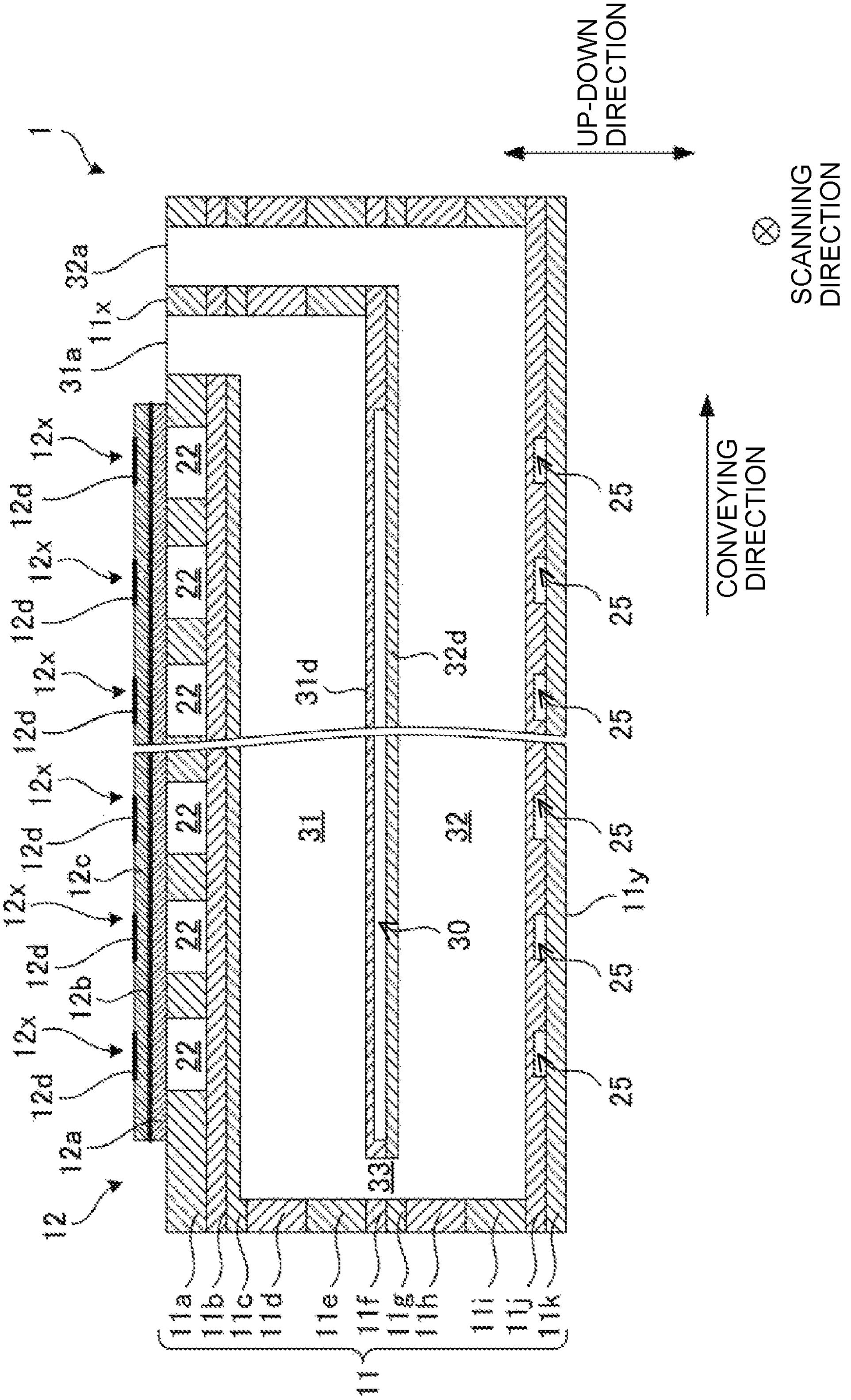
FIG. 5 is a cross-sectional view of the ink-jet head along a V-V line in FIG. 2.

The channel unit 11 is constructed of 11 pieces of plates which are plates 11*a* to 11*k* stacked in the up-down direction (an example of a "stacking direction" of the present invention) and adhered to one another, as depicted in FIGS. 3 to 5. A plurality of individual channels 20, a plurality of supply throttles 24, a plurality of return throttles 25, a supply manifold 31, a return manifold 32 and a linking channel 33 are formed in the inside of the channel unit 11. Note that in FIG. 2, the plurality of individual channels 20, the plurality of supply throttles 24, and the plurality of return throttles 25 are omitted in the illustration.

Through hole(s) and/or recessed part(s) constructing the plurality of individual channels 20, the plurality of supply throttles 24, the plurality of return throttles 25, the supply manifold 31, the return manifold 32 and the linking channel 33 are/is formed in the respective plates 11*a* to 11*k*. The through hole(s) and/or the recessed part(s) formed in the respective plates 11*a* to 11*k* are/is formed by etching.

As depicted in FIG. 2, the supply manifold 31 and the return manifold 32 are formed as four supply manifolds 31 and four return manifolds 32. Each of the four supply manifolds 31 and the four return manifold 32 extends along the conveying direction. The four supply manifolds 31 are arranged side by side in the scanning direction at equal spacing distances therebetween. Also regarding the four return manifold 32, the four return manifolds 32 are arranged side by side in the scanning direction at equal spacing distances therebetween. As depicted in FIGS. 3 to 5, the four return manifolds 32 are located below the four supply manifolds 31. The four suppl manifolds 31 and the four return manifolds 32 overlap with one another in the up-down direction, respectively. The black, yellow, cyan and magenta inks flow, respectively, in the four supply manifolds 31 and the four return manifolds 32.

As depicted in FIG. 5, an end part on the upstream side in the conveying direction of each of the four supply manifolds 31 and an end part on the upstream side in the conveying direction of each of the four return manifolds 32 are connected by the linking channel 33.

Each of the four supply manifolds 31 is communicated with the ink tank 6 via a supply port 31*a* provided on an end part on the downstream side in the conveying direction thereof. Further, each of the four return manifolds 32 is communicated with the ink tank 6 via a return port 32*a* provided on an end part on the downstream side in the conveying direction thereof. Four pieces of the supply port 31*a* and four pieces of the return port 32*a* are opened in an upper surface 11*x* of the channel unit 11.

Each of the plurality of individual channels 20 has one of the plurality of nozzles 21. A pair of one of the four supply manifolds 31 and one of the four return manifolds 32 which are arranged in the up-down direction are provided commonly with respect to individual channels 20 having nozzles 21 included in one of the four nozzle rows 21*a* (see FIG. 1). A certain supply manifold 31 of the four supply manifolds 31 supplies the ink to each of the individual channels 20 provided corresponding to the certain supply manifold 31. The ink, flowed out from each of the individual channels 20 provided corresponding to a certain return manifold 32 of the four return manifolds 32, flows into the certain return manifold 32. As depicted in FIG. 3, the individual channels 20 are located on the left side in the scanning direction with respect to the supply manifold 31 and the return manifold 32 to which the individual channels 20 are connected.

Each of the plurality of supply throttles 24 links or connects the supply manifolds 31 and one of the individual channels 20 provided with respect to the supply manifold 31. Each of the plurality of return throttles 25 links or connects the return manifold 32 and one of the individual channels 20 provided with respect to the return manifold 32.

The ink inside the ink tank 6 is fed from the supply port 31*a* to the supply manifold 31 by the head difference. The ink fed into the supply manifold 31 is supplied to each of the individual channels 20 via the supply throttle 24, while moving in the inside of the supply manifold 31 from the downstream side toward the upstream side in the conveying direction (see FIG. 3). The ink which has flowed out from each of the individual channels 20 flows into the return manifold 32, via the return throttle 25. Further, the ink which has reached the end part on the upstream side in the conveying direction of the supply manifold 31 passes through the linking channel 33 and flows into the return manifold 32. The ink inflowed into the return manifold 32 moves in the inside of the return manifold 32 from the upstream side toward the downstream side in the conveying direction, and the ink is returned to the ink tank 6 via the return port 32*a*.

As depicted in FIGS. 3 to 5, the supply manifold 31 is defined by a recessed part which is formed in the plate 11*c* and of which lower part is opened, and through holes formed, respectively, in the plate 11*d* and the plate 11*e*. The return manifold 32 is defined by a recessed part which is formed in the plate 11*g* and of which lower part is opened, and through holes formed, respectively, in the plate 11*h* and the plate 11*i*.

A damper chamber 30 is provided between, in the up-down direction, the supply manifold 31 and the return manifold 32. The damper chamber 30 is defined by a recessed part formed in the plate 11*f* and of which lower part is opened. A bottom part of the recessed part in the plate 11*f* functions as a damper film 31*d* of the supply manifold 31. A bottom part of the recessed part, in the plate 11*g*, which defines the return manifold 32 functions as a damper film 32*d* of the return manifold 32.

As depicted in FIG. 3, each of the plurality of individual channels 20 includes a nozzle 21, a pressure chamber 22 and a connecting channel 23 formed of a first channel 23*a* and a second channel 23*b*.

The nozzle 21 is defined by a through hole formed in the plate 11*k*, and is opened in the nozzle surface 11*y* which is the lower surface of the channel unit 11.

The pressure chamber 22 is defined by a through hole formed in the plate 11*a*, and is opened in the upper surface 11*x* of the channel unit 11. The pressure chamber 22 has an end part on the right side in the scanning direction to which the supply throttle 24 is connected, and an end part on the left side in the scanning direction to which the connecting channel 23 is connected.

The connecting channel 23 connects the nozzle 21 and the pressure chamber 22 to each other. The first channel 23*a* of the connecting channel 23 is defined by the through hole formed in the plate 11*j*. The first channel 23*a* overlaps with the nozzle 21 in a top view. Namely, the nozzle 21 is connected to an intermediate part of the first channel 23*a*. The first channel 23*a* has an end part on the right side in the scanning direction to which the return throttle 25 is connected, and an end part on the left side in the scanning direction to which the second channel 23*b* is connected. The second channel 23*b* of the connecting channel 23 is defined by through holes formed, respectively, in the plates 11*b* to 11*i*, and extends along the up-down direction. The second channel 23*b* is separated from the nozzle 21 with respect to the scanning direction, and links or connects the pressure chamber 22 and the first channel 23*a*.

The supply throttle 24 connects the supply manifold 31 and the pressure chamber 22 with each other. The supply throttle 24 is defined by: a recessed part formed in the plate 11*b* and which is opened in the lower surface of the plate 11*b*; a through hole which is positioned at an end part on the left side in the scanning direction of the recessed part; and a through hole formed in the plate 11*c*. The recessed part formed in the plate 11*b* extends along the scanning direction. The recessed part formed in the plate 11*b* has a depth (a length along the up-down direction) and a width (a length along the conveying direction) each of which is constant with respect to the scanning direction. The supply throttle 24 is connected to the pressure chamber 22 via the through hole formed in the plate 11*b*. Further, the supply throttle 24 is connected to the supply manifold 31 by a through hole formed in a bottom part of the recessed part formed in the plate 11*c* to define the supply manifold 31. The supply throttle 24 has a cross-sectional area in a plane orthogonal to the scanning direction (the flowing direction of the ink in the supply throttle 24) which is smaller than the cross-sectional area in the plane orthogonal to the scanning direction of the pressure chamber 22.

The return throttle 25 connects the return manifold 32 and the first channel 23*a* of the connecting channel 23 with each other. The return throttle 25 is defined by: a recessed part formed in the plate 11*j* and which is opened in the lower surface of the plate 11*j*; and a through hole which is positioned at an end part on the right side in the scanning direction of the recessed part. The recessed part formed in the plate 11*j* extends along the scanning direction. The recessed part formed in the plate 11*j* has a depth (a length along the up-down direction) and a width (a length along the conveying direction) each of which is constant with respect to the scanning direction. The return throttle 25 is connected to the return manifold 32 via the through hole which is positioned at the end part on the right side in the scanning direction of the recessed part formed in the plate 11*j*. An end part on the left side in the scanning direction of the recessed part formed in the plate 11*j* and defining the return throttle 25 is linked or connected to the through hole defining the first channel 23*a* of the connecting channel 23. The return throttle 25 has a cross-sectional area in the plane orthogonal to the scanning direction (the flowing direction of the ink in the return throttle 25) which is smaller than the cross-sectional area in the plane orthogonal to the scanning direction of the first channel 23*a* of the connecting channel 23.

The ink supplied from the supply manifold 31 to the individual channel 20 flows in the supply throttle 24 from the right side toward the left side in the scanning direction, flows into the pressure chamber 22, moves substantially horizontally in the inside of the pressure chamber 22, and flows into the connecting channel 23. The ink flowed into the connecting channel 23 flows downward in the second channel 23*b*, and then the ink flows into the first channel 23*a*. A part of the ink flowed into the first channel 23*a* is discharged from the nozzle 21, and the remainder of the ink flows in the return throttle 25 from the left side toward the right side in the scanning direction, and flows into the return manifold 32.

By circulating the ink between the ink tank 6 and the channel unit 11 in such a manner, it is possible to realize exhaust (discharge) of air and/or prevention of increase in the viscosity of the ink in the supply manifold 31 and the return manifold 32 formed in the channel unit 11, and further in each of the plurality of throttle channel 24, each of the plurality of individual channels 20 and each of the plurality of return throttles 25 formed in the channel unit 11. Further, in a case that the ink contains any sedimentary component (a component which might sediment, such as a pigment, etc.), such a sedimentary component is agitated, thereby preventing the sedimentation thereof.

As depicted in FIGS. 3 to 5, the piezoelectric actuator 12 includes a vibration plate 12*a*, a common electrode 12*b*, a piezoelectric layer 12*c* and a plurality of individual channels 12*d*, in this order from the lower side.

The vibration plate 12*a* is arranged on the upper surface 11*x* of the channel unit 11. The common electrode 12*b*, the piezoelectric layer 12*c* and the plurality of individual electrodes 12*d* which are stacked in order from the lower side are arranged in an area, in the upper surface of the vibration plate 12*a*, which faces the plurality of pressure chambers 22. The vibration plate 12*a*, the common electrode 12*b* and the piezoelectric layer 12*c* are arranged to span across the plurality of pressure chambers 22. Each of the plurality of individual electrodes 12*d* is provided on one of the plurality of pressure chambers 22, and overlaps with one of the plurality of pressure chamber 22 in the top view.

The common electrode 12*b* and the plurality of individual electrodes 12*d* are connected to a non-illustrated driver IC via a non-illustrated wiring member. The driver IC maintains the potential of the common electrode 12*b* at the ground potential, whereas the driver IC changes the potential of the plurality of individual electrodes 12*d*. With this, a part of the vibration plate 12*a* and a part of the piezoelectric layer 12*c* which are interposed between each of the plurality of individual electrodes 12*d* and the one of the plurality of pressure chambers 22 (an actuator 12*x*) is deformed so as to project toward the pressure chamber 22. Due to this deformation, the volume of the pressure chamber 22 becomes small, which in turn increase the pressure of the ink inside the pressure chamber 22, thereby causing the ink to be discharged from a nozzle 21 corresponding to the pressure chamber 22. Namely, the piezoelectric actuator 12 has a plurality of actuators 12*x* each of which corresponds to one of the plurality of pressure chambers 22.

<Supply Throttle 24 and Return Throttle 25>

Next, the supply throttle 24 and the return throttle 25 will be explained in a more detailed manner. As depicted in FIG. 4, each of the supply throttle 24 and the return throttle 25 has a cross section, in the plane orthogonal to the scanning direction (the flowing direction of the ink therein), which has a substantially rectangular shape having a first side extending along the up-down direction (stacking direction) and a second side extending along the conveying direction. Here, a length of the first side of the supply throttle 24 is referred to as $L_{S1}$, a length of the first side of the return throttle 25 is referred to as $L_{R1}$, a length of the second side of the supply throttle 24 is referred to as $L_{S2}$, and a length of the second side of the return throttle 25 is referred to as $L_{R2}$. Further, an aspect ratio ($L_{S2}/L_{S1}$) of the supply throttle 24 is referred to as $A_S$, and an aspect ratio ($L_{R2}/L_{R1}$) of the return throttle 25 is referred to as $A_R$.

The length of the first side of the supply throttle 24 and the length of the first side of the return throttle 25 are substantially same (identical). The length of the second side of the supply throttle 24 and the length of the second side of the return throttle 25 are substantially same (identical). The aspect ratio of the supply throttle 24 being the ratio between the first side of the supply throttle 24 and the second side of the supply throttle 24 and the aspect ratio of the return throttle 25 being the ratio between the first side of the return throttle 25 and the second side of the return throttle 25 are substantially same (identical). Specifically, the relationship between the length $L_{S1}$ of the first side of the supply throttle 24 and the length $L_{R1}$ of the first side of the return throttle 25 is $0.8<L_{S1}/L_{R1}<1.2$. The relationship between the length $L_{S2}$ of the second side of the supply throttle 24 and the length $L_{R2}$ of the second side of the return throttle 25 is $0.8<L_{S2}/L_{R2}<1.2$. The relationship between aspect ratio $A_S$ of the supply throttle 24 and the aspect ratio $A_R$ of the return throttle 25 is $0.8<A_S/A_R<1.2$.

As an example, with respect to the supply throttle 24, the length $L_{S1}$ of the first side is $L_{S1}=30$ μm, and the length $L_{S2}$ of the second side is $L_{S2}=88$ μm; with respect to the return throttle 25, the length $L_{R1}$ of the first side is $L_{R1}=28$ μm, and the length $L_{R2}$ of the second side is $L_{R2}=84$ μm. In this situation, the aspect ratio $A_S$ of the supply throttle 24 is approximately 2.9, and the aspect ratio $A_R$ of the return throttle 25 is approximately 3.0. Further, $L_{S1}/L_{R1}$ is approximately 1.1; $L_{S2}/L_{R2}$ is approximately 1.0; and $A_S/A_R$ is approximately 1.0. It is preferred that a difference in the length ($L_{S1}-L_{R1}$) between the first side of the supply throttle 24 and the first side of the return throttle 25 and a difference in the length ($L_{S2}-L_{R2}$) between the second side of the supply throttle 24 and the second side of the return throttle 25 are each within a range between −4 μm and +4 μm (not more than 4 μm in absolute value).

In each of the supply throttle 24 and the return throttle 25, the length of the first side along the up-down direction (stacking direction) is shorter than the length of the second side along the conveying direction. Namely, $L_{S1}<L_{S2}$ and $L_{R1}<L_{R2}$ are held.

Further, a length $L_{S3}$ along the scanning direction (flowing direction of the ink in the supply throttle 24) of the supply throttle 24 and a length $L_{R3}$ along the scanning direction (flowing direction of the ink in the return throttle 25) of the return throttle 25 are mutually different. Specifically, for example, $L_{S3}$=610 μm to 700 μm, and $L_{R3}$=500 μm to 600 μm.

As depicted in FIGS. 3 and 4, a supply throttle 24 among the plurality of supply throttles 24 and a return throttle 25 among the plurality of return throttles 25 which are connected to a same individual channel 20 among the plurality of individual channels 20 overlap partially with each other in the up-down direction (stacking direction).

As described above, the supply throttle 24 is defined by the recessed part which is opened in the lower surface of the plate 11*b*. The supply throttle 24 is covered by the plate 11*c* which is adjacent to the plate 11*b* at a location below the plate 11*b*. Further, the return throttle 25 is defined by the recessed part which is opened in the lower surface of the plate 11*j*. The return throttle 25 is covered by the plate 11*k* which is adjacent to the plate 11*j* at a location below the plate 11*j*. A contact angle, with respect to the ink, of the plate 11*c* covering the supply throttle 24 and a contact angle, with respect to the ink, of the plate 11*k* covering the return throttle 25 are each not more than 45°.

Characteristics of Embodiment

As described above, in the ink-jet head 1 of the present embodiment, the plurality of supply throttles 24 each of which connects or links one of the plurality of individual channels 20 with the supply manifold 31, and the plurality of return throttles 25 each of which connects or links one of the plurality of individual channels 20 to the return manifold 32 are formed in the channel unit 11 constructed of the plurality of plates 11*a* to 11*k* which are stacked in the up-down direction. The plurality of supply throttles 24 and the plurality of return throttles 25 are formed, respectively, in the mutually different plates 11*b* and 11*j*, and each of the plurality of supply throttles 24 and the plurality of return throttles 25 has the cross section, in the plane orthogonal to the flowing direction of the ink therein, which has the rectangular shape having the first side and the second side. The length of the first side, the length of the second side and the aspect ratio which is the ratio between the first side and the second side are substantially same between the supply throttle 24 and the return throttle 25. Specifically, the relationship between the length $L_{S1}$ of the first side of the supply throttle 24 and the length $L_{R1}$ of the first side of the return throttle 25 is $0.8<L_{S1}/L_{R1}<1.2$. The relationship between the length $L_{S2}$ of the second side of the supply throttle 24 and the length $L_{R2}$ of the second side of the return throttle 25 is $0.8<L_{S2}/L_{R2}<1.2$. The relationship between the aspect ratio $A_S$ of the supply throttle 24 and the aspect ratio $A_R$ of the return throttle 25 is $0.8<A_S/A_R<1.2$. Further, the difference in the length ($L_{S1}-L_{R1}$) between the first side of the supply throttle 24 and the first side of the return throttle 25 and the difference in the length ($L_{S2}-L_{R2}$) between the second side of the supply throttle 24 and the second side of the return throttle 25 are each within a range between −4 μm and +4 μm (not more than 4 μm in absolute value).

According to the above-described configuration, even in a case that the supply throttle 24 and the return throttle 25 are formed, in the mutually different plates 11*b* and 11*j*, it is possible to make the difference between the deviating amount from the designed value of the supply throttle 24 and the deviating amount from the designed value of the return throttle 25 to be small, because each of the lengths of the first side, the lengths of the second side, and aspect ratios is substantially identical to each other between a rectangle cross section of the supply throttle 24 and a rectangular cross section of the return throttle 25. Accordingly, it is possible to make the influence of the manufacturing errors in the supply throttle 24 and the return throttle 25 on the pressure in the vicinity of the nozzle 21 to be small.

Further, in the ink-jet head 1 of the above-described embodiment, each of the supply throttle 24 and the return throttle 25 is defined by the recessed part which is opened in the lower surface of the plate (the plate 11*b* regarding the supply throttle 24 and the plate 11*j* regarding the return throttle 25). Accordingly, the supply throttle 24 and the return throttle 25 can be formed under a same condition, and thus it is possible to make the extent or degree of the manufacturing error of the supply throttle 24 and the extent or degree of the manufacturing error of the return throttle 25 to be similar, and consequently it is possible to make the different between the deviating amount from the designed value of the supply throttle 24 the deviating amount from the designed value of the return throttle 25 to be small, in a more ensured manner.

Furthermore, in the ink-jet head 1 of the above-described embodiment, the rectangular-shaped cross section of each of the supply throttle 24 and the return throttle 25 has the first side which extends along the up-down direction and which is shorter than the second side extending along the conveying direction. In a case that the supply throttle 24 and/or the return throttle 25 are/is made by the etching, it is difficult to make, by the etching, the depth of each of the supply throttle 24 and the return throttle 25 to be deep (to make the length of the first side to be great). In the above-described configuration, the first side which is the depth of each of the supply throttle 24 and the return throttle 25 is shorter than the second side which is the width of each of the supply throttle 24 and the return throttle 25. Accordingly, it is possible to form each of the supply throttle 24 and the return throttle 25 easily by the etching.

In addition, in the ink-jet head 1 of the above-described embodiment, a supply throttle 24 among the plurality of supply throttles 24 and a return throttle 25 among the plurality of return throttles 25 which are connected to a same individual channel 20 among the plurality of individual channels 20 overlap partially with each other in the up-down direction (stacking direction). Accordingly, the supply throttle 24 and the return throttle 25 which are connected to the same individual channel 20 are formed at the same or close positions, respectively, in the planes of the respective plates 11*b* and 11*b*, as seen from the up-down direction. Thus, in terms of the performance of a throttle forming apparatus (etching apparatus), it is possible to make the extent or degree of the manufacturing error of the supply throttle 24 and the extent or degree of the manufacturing error of the return throttle 25 to be similar, and consequently it is possible to make the different between the deviating amount from the designed value of the supply throttle 24 and the deviating amount from the designed value of the return throttle 25 to be small, in a more ensured manner.

Moreover, in the ink-jet head 1 of the above-described embodiment, the supply throttle 24 and the return throttle 25 are covered by the plate which is adjacent thereto (the plate 11*c* regarding the supply throttle 24 and the plate 11*k* regarding the return throttle 25). The contact angle, with respect to the ink, of each of the plates 11*c* and 11*k* is not more than 45°. In a case that the contact angle, of the surface defining each of the supply and return throttles 24 and 25 exceeds 45°, each of the supply and return throttles 24 and 25 may not be filled by the ink (namely, the ink may not be appropriately introduced to each of the supply and return throttles 24 and 25), and the pressure of the ink in the vicinity of the nozzle 21 may be deviated from the designed value. In the above-described configuration, since the contact angle, with respect to the ink, of the surface defining each of the supply throttle 24 and the return throttle 25 is not more than 45°, and the wettability is satisfactory, each of the supply throttle 24 and the return throttle 25 is easily filled with the ink (namely, the ink can be appropriately introduced to each of the supply throttle 24 and the return throttle 25). Accordingly, it is possible to make deviation of the pressure of the ink in the vicinity of the nozzle 21 from the design value to be small.

Further, in the ink-jet head 1 of the above-described embodiment, the length along the scanning direction (flowing direction of the ink) is different between the supply throttle 24 and the return throttle 25. In the present embodiment, although the length of the first side and the length of the second side in the cross section orthogonal to the flowing direction of the ink are substantially same between the supply throttle 24 and the return throttle 25, it is possible to design such that the pressure in the vicinity of the nozzle 21 is made to be a desired pressure, by adjusting the length of the supply throttle 24 along the flowing direction of the ink in the supply throttle 24 and/or the length of the return throttle 25 along the flowing direction of the ink in the return throttle 25.

Second Embodiment

Next, an ink-jet head 101 according to a second embodiment of the present disclosure will be explained, with reference to FIG. 6. The ink-jet head 101 according to the second embodiment is different from the first embodiment in view of the configurations of supply throttles 124 and return throttles 125. In the following description, same reference numerals are affixed to the configuration similar to that of the first embodiment, and any overlapping explanation therefor will be omitted.

Figure 6:
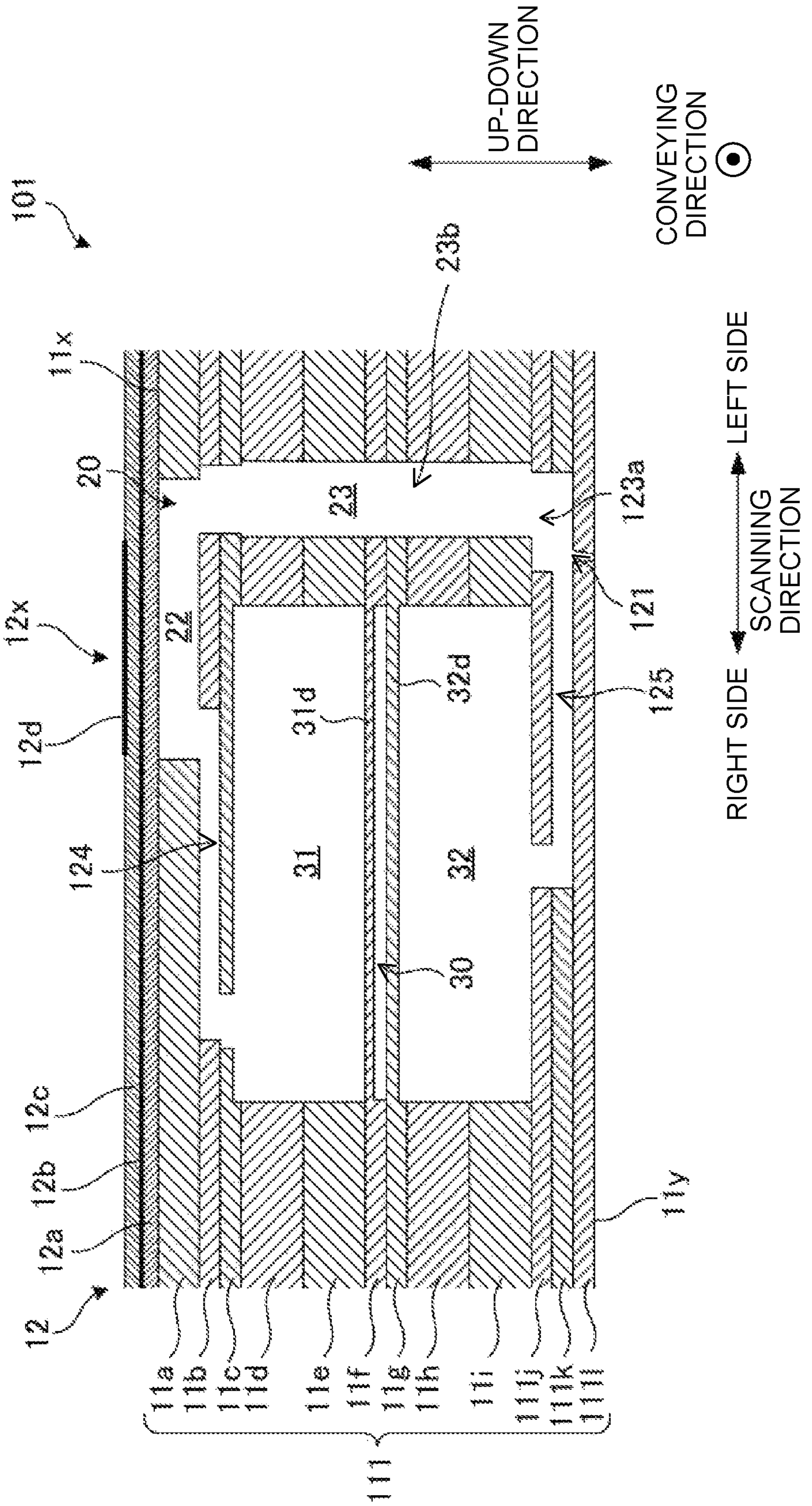
FIG. 6 is a cross-sectional view of an ink-jet head.

As depicted in FIG. 6, a channel unit 111 of the ink-jet head 101 of the second embodiment is constructed of 12 (twelve) plates which are plates 11*a* to 11*i* and plates 111*j* to 111*l*. The nozzle 121 is defined by a through hole formed in the plate 111*l*, and a first channel 123*a* of the connecting channel 23 is defined by through holes formed, respectively, in the plate 111*j* and 111*k*.

The supply throttle 124 is defined by a through hole formed in the plate 11*b*. The return throttle 125 is defined by a through hole formed in the plate 111*k*. The thickness of the plate 11*b* in which the supply throttle 124 is formed is same as the thickness of the plate 111*k* in which the return throttle 125 is formed. The thickness of each of the plate 11*b* and the plate 111*k* is 50 μm. Each of the supply throttle 124 and the return throttle 125 has a cross section, in the plane orthogonal to the flowing direction of the ink therein, which has a substantially rectangular shape having a first side and a second side. A length of the first side, a length of the second side, and an aspect ratio which is the ratio between the first side and the second side are each substantially same between the supply throttle 124 and the return throttle 125.

The supply throttle 124 is covered by the plates 11*a* and 11*c* which are adjacent to the plate 11*b* in which the through hole defining the supply throttle 124 is formed. The return throttle 125 is covered by the plates 111*j* and 111*l* which are adjacent to the plate 111*k* in which the through hole defining the return throttle 125 is formed. The contact angle, with respect to the ink, of each of the plates 11*a* and 11*c* covering the supply throttle 124 and the contact angle, with respect to the ink, of each of the plates 111*j* and 111*l* covering the return throttle 125 are each not more than 45°.

Also in the ink-jet head 101 of the second embodiment, it is possible to make the different between the deviating amount from the designed value of the supply throttle 124 and the deviating amount from the designed value of the return throttle 125 to be small, and thus it is possible to making the influence of the manufacturing errors in the supply throttle 124 and the return throttle 125 on the pressure in the vicinity of the nozzle 21 to be small.

Further, in the ink-jet head 101, the supply throttle 124 and the return throttle 125 are defined by the through holes which are formed, respectively, in the plates 11*b* and 111*k* having the same thickness. Accordingly, since it is possible to make the depths to be same between the supply throttle 124 and the return throttle 125, it is possible to make the different between the deviating amount from the designed value of the supply throttle 124 and the deviating amount from the designed value of the return throttle 125 to be small, in a more ensured manner.

Although the embodiment of the present disclosure has been explained in the foregoing based on the drawings, the specific configuration of the present disclosure should be considered as not being limited to or restricted by these embodiments. The scope of the present invention is indicated by the scope of the claims, rather than by the explanation of the embodiment as described above; further, the scope of the present invention encompasses any variation equivalent in meaning to the scope of the claims and within the scope of the claims.

In the above-described embodiment, although the explanation has been made regarding the case wherein each of the supply throttle 24 and the return throttle 25 is defined by the recessed part which is opened in the lower surface of the plate (the plate 11*b* regarding the supply throttle 24, the plate 11*j* regarding the return throttle 25), it is allowable that each of the supply throttle 24 and the return throttle 25 is defined by a recessed part which is opened in the upper surface of the plate.

In the above-described embodiments, although the explanation has been made regarding the case wherein the rectangular cross section, of each of the supply throttles 24, 124 and the return throttles 25, 125, in the plane orthogonal to the flowing direction of the ink therein has the first side which extends along the up-down direction (stacking direction) and which is shorter than the second side extending along the conveying direction, the present disclosure is not limited thereto. It is allowable that the length of the first side is not less than the length of the second side.

Further, in the above-described embodiments, although the explanation has been made regarding the case wherein a supply throttles 24, 124 and a return throttles 25, 125 which are connected to a same individual channel 20 overlap partially with each other in the up-down direction (stacking direction), it is allowable that the supply throttles 24, 124 and the return throttles 25, 125 are not overlapped in the up-down direction (stacking direction).

Furthermore, in the above-described embodiments, although the explanation has been made regarding the case wherein each of the plates 11*c* and 11*k* which cover, respectively, the supply throttles 24 and the return throttles 25 and each of the plates 11*a* and 11*c*, and 111*j* and 111*l* which cover, respectively, the supply throttles 124 and the return throttles 125 has the contact angle, with respect to the ink, which is not more than 45°, the present disclosure is not limited thereto. The contact angle, of each of these plates, with respect to the ink may be greater than 45°.

Moreover, in the above-described embodiments, although the explanation has been made regarding the case wherein the length $L_{S3}$ along the flowing direction of the ink of each of the supply throttles 24, 124 and the length $L_{R3}$ along the flowing direction of the ink of each of the return throttles 25, 125 are mutually different, it is allowable that these lengths along the flowing direction of the ink in these throttles are same.

The actuator 12*x* is not limited to that of the piezoelectric system using the piezoelectric element; it is allowable that the actuator 12*x* is of another system (for example, a thermal system using a heating element, an electrostatic system using the electrostatic force, etc.).

The recording system of the printer 100 is not limited to the serial system; the recording system may be the line system in which a head is long in the width direction of the recording sheet P, and the ink is discharged from nozzles of the head fixed in a position.

The liquid discharged from the nozzles 21 is not limited to the ink, and may be any liquid (e.g., a treatment liquid that agglutinates or precipitates a component of an ink). Further, an object of discharge is not limited to the recording sheet P, and may be, for example, cloth (fabric), a substrate, etc.

The present disclosure is not limited to the printer, and is applicable also to facsimiles, copy machines, multifunction peripherals, etc. Further, the present disclosure is also applicable to a liquid discharge apparatus used for any other application than the image recording (for example, a liquid discharge apparatus which forms an electroconductive pattern by discharging an electroconductive liquid on a substrate).

What is claimed is:

1. A liquid discharging head having a plurality of plates stacked in a stacking direction, the liquid discharging head comprising:

a plurality of individual channels each has a nozzle configured to discharge a liquid;

a supply manifold which is provided commonly to the plurality of individual channels and which is configured to supply the liquid to the plurality of individual channels;

a plurality of supply throttles each connecting one of the plurality of individual channels and the supply manifold;

a return manifold which is provided commonly to the plurality of individual channels and into which the liquid flowed out from the plurality of individual channels flows; and a plurality of return throttles each connecting one of the plurality of individual channels and the return manifold, wherein each of the plurality of individual channels, the supply manifold, the plurality of supply throttles, the return manifold and the plurality of return throttles is formed in the plurality of plates;

the plurality of supply throttles is formed in a first plate of the plurality of plates and the plurality of return throttles is formed in a second plate of the plurality of plates different from the first plate;

each of the plurality of supply throttles has a cross section, in a plane orthogonal to a flowing direction of the liquid in the each of the plurality of supply throttles, which is a rectangle having a first side and a second side, a length of the second side being not less than a length of the first side;

each of the plurality of return throttles has a cross section, in a plane orthogonal to a flowing direction of the liquid in the each of the plurality of return throttles, which is a rectangle having a first side and a second side, a length of the second side being not less than a length of the first side;

the length of the first side of each of the plurality of supply throttles and the length of the first side of each of the plurality of return throttles are substantially identical to each other;

the length of the second side of each of the plurality of supply throttles and the length of the second side of each of the plurality of return throttles are substantially identical to each other; and an aspect ratio of each of the plurality of supply throttles which is a ratio between the first side of each of the plurality of supply throttles and the second side of each of the plurality of supply throttles and an aspect ratio of each of the plurality of return throttles which is a ratio between the first side of each of the plurality of return throttles and the second side of each of the plurality of return throttles are substantially identical to each other.

2. The liquid discharging head according to claim 1, wherein each of the plurality of supply throttles is defined by a through hole formed in the first plate, and each of the plurality of return throttles is defined by a through hole formed in the second plate; and thickness of the first plate and thickness of the second plate are identical to each other.

3. The liquid discharging head according to claim 1, wherein each of the plurality of supply throttles is defined by a recess opened in a surface of the first plate on one side in the stacking direction; and each of the plurality of return throttles is defined by a recess opened in a surface of the second plate on the one side in the stacking direction.

4. The liquid discharging head according to claim 1, wherein the first side of each of the plurality of supply throttles extends along the stacking direction, and the length of the first side of each of the plurality of supply throttles is shorter than the length of the second side of each of the plurality of supply throttles; and the first side of each of the plurality of return throttles extends along the stacking direction, and the length of the first side of each of the plurality of return throttles is shorter than the length of the second side of each of the plurality of return throttles.

5. The liquid discharging head according to claim 1, wherein one of the plurality of supply throttles connected to one of the plurality of individual channels and one of the plurality of return throttles connected to the one of the plurality of individual channels partially overlap with each other in the stacking direction.

6. The liquid discharging head according to claim 1, wherein the plurality of supply throttles is covered by a first adjacent plate being one of the plurality of plates;

the plurality of return throttles is covered by a second adjacent plate being one of the plurality of plates; and a contact angle of the first adjacent plate with respect to the liquid and a contact angle of the second adjacent plate with respect to the liquid are each not more than 45°.

7. The liquid discharging head according to claim 1, wherein a length of each of the plurality of supply throttles along the flowing direction of the liquid in the each of the plurality of supply throttles and a length of each of the plurality of return throttles along the flowing direction of the liquid in the each of the plurality of return throttles are different from each other.

8. The liquid discharging head according to claim 1, wherein provided that the length of the first side of each of the plurality of supply throttles is $L_{S1}$, the length of the first side of each of the plurality of return throttles is $L_{R1}$, the length of the second side of each of the plurality of supply throttles is $L_{S2}$, the length of the second side of each of the plurality of return throttles is $L_{R2}$, the aspect ratio $(L_{S2}/L_{S1})$ of each of the plurality of supply throttles is $A_s$, and the aspect ratio $(L_{R2}/L_{R1})$ of each of the plurality of return throttles is $A_R$, the following relationships are held:

$$0.8 < L_{S1}/L_{R1} < 1.2,$$

$$0.8 < L_{S2}/L_{R2} < 1.2 \text{ and}$$

$$0.8 < A_S/A_R < 1.2.$$

9. A printing apparatus comprising;
the liquid discharging head as defined in claim 1, and
a conveyer configured to convey a printing medium to which a liquid is to be discharged from the liquid discharging head.

* * * * *